July 24, 1934.  H. ACHT  1,967,214
PHOTOGRAPHIC LENS SYSTEM
Filed Feb. 20, 1934
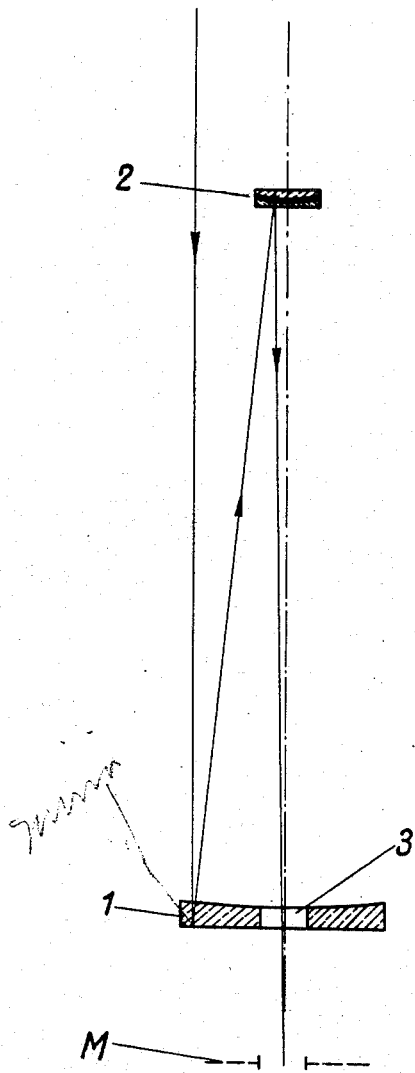
Inventor:
Heinrich Acht
by A.D. Adams
atty.

Patented July 24, 1934

1,967,214

UNITED STATES PATENT OFFICE 1,967,214

PHOTOGRAPHIC LENS SYSTEM

Heinrich Acht, Berlin, Germany

Application February 20, 1934, Serial No. 712,221
In Germany February 15, 1933

3 Claims. (Cl. 88—57)

My invention relates to a novel photographic lens system, more particularly, to a lens system with relatively great focal length.

One of the objects of my invention is to reduce the overall dimensions of lens systems with great focal length. The present photographic lens systems permit photographing in the wavelength range of at best C ($\lambda=656\mu\mu$) to G' ($\lambda=436\mu\mu$). Another object of my invention is to increase this range from the ultraviolet $\lambda=380\mu\mu$ continuously into the infra-red. Another object of my invention is to build a lens system the center of gravity of which is as close as possible to the camera proper thus avoiding the necessity of very heavy design to prevent oscillations.

Further objects of my invention will appear from the following description in connection with the accompanying illustrative diagrammatic sketch.

In order to photograph distant objects, lens systems with great focal length i. e. of 40 inches and more are used to obtain the desired details on the light sensitive plate materials. Usually it will be necessary to use filters in combination with these lens systems to penetrate dust. It is furthermore known that mist is penetrated by infra-red light. As negative materials are known which are sensitive to this part of the spectrum it is desirable to have a lens system which permits photographing from the ultraviolet into the infra-red part of the spectrum with the same lens system without the necessity of making any adjustments on either the camera or the lens system. The very scope of my invention therefore consists in providing a lens system which in combination with the suitable negative material and an ordinary plane filter permits photographing within this wider spectral range without the necessity of any adjustment of this lens system or the camera.

The figure is a diagrammatic sketch of such a lens system. The lens system consists of a mirror 1 which receives the light from the object on which it is focussed and a mirror lens system 2 which reflects this light through an opening 3 provided in the mirror 2 and produces a real image on the ground glass plane.

One of the main features of my lens systems is that the secondary reflecting lens mirror combination 2 consists at least of two lens systems separated from each other; one of which has a positive focal length while the other has a negative one. It is understood however that each individual lens may be a combination of a plurality of cemented lenses.

This design provides a sufficient number of surfaces the suitable shape of which permits in combination a very effective and far reaching correction of image errors.

The spherical correction can be realized by choosing suitable design data until a complete straightening of the curve of aberration is obtained whereby simultaneously also the sine conditions are taken care of.

By choosing suitable glass materials the chromatic aberration in the axis as well as the chromatic differences of the spherical aberration can be compensated to a high degree so as to avoid lack of sharpness which would materially affect the picture particularly for these great focal length systems. Greatest flexibility exists in this design with regard to the dimension of the lens system so that special problems can easily be taken care of.

The material used for the mirror lens system 2 has to be within the following range of properties. The indices of refraction of the D line of the spectrum (589.3$\mu\mu$ wavelength) must not differ more than 5/100 units the figures of Abbé not more than 5 units.

The other errors which occur in photographic lens systems, astigmatism, distortion, coma and the like can also be avoided by suitable design in accordance with the methods of calculation known to the art.

Having thus described design and material of my invention in detail what I claim is:

1. A photographic lens system comprising, in combination, a primary light collecting and reflecting mirror system having a central opening; and a secondary combined lens and mirror system producing a real image through said opening in said primary mirror on the focal plane of the system, said secondary mirror lens system being a combination of at least two individual, axially spaced lenses and a mirror on the back of the rear lens, one of said lenses having a positive focal length and the other a negative focal length, and all reflecting and refracting members of the lens system being corrected for spherical, chromatic and astigmatic errors.

2. A photographic lens system comprising, in combination, a primary light collecting and reflecting mirror having a central opening; a secondary combined lens and mirror system producing a real image through said opening in said primary mirror on the focal plane of the system, said secondary combined mirror and lens system being within the focal distance of the primary system and comprising a combination of at least two individual and axially separated lenses and a mirror on the back of the rear lens, one of said lenses being of positive focal length and the other being of negative focal length, all reflecting and refracting members of the lens system being corrected for spherical, chromatic and astigmatic errors, and said lenses of the secondary system being made of material whereof the indices of refraction for the D line of the spectrum (589.3) do not differ more than 5/100 units and the Abbé figures not more than five units.

3. A photographic lens system comprising, in combination, a combined lens and mirror constituting a primary collecting and reflecting system and having a central opening through which an image is adapted to be projected; a relatively small secondary reflecting system comprising at least two axially separated lenses one of said lenses having a positive and the other having a negative focal length arranged on the focal axis of the primary reflecting system; and a mirror on the back of the rear lens; said secondary reflecting system being arranged to project a real image through said opening in the primary reflecting system, all reflecting and refracting members of the system being corrected for spherical, chromatic and astigmatic errors, and the construction and arrangement being such as to permit photography within the wave length range of the spectrum from the lower range in the ultraviolet into the infra-red.

HEINRICH ACHT.